US012246751B1

(12) United States Patent
Okamoto

(10) Patent No.: US 12,246,751 B1
(45) Date of Patent: Mar. 11, 2025

(54) TRAJECTORY MODIFICATION BASED ON WIND COMPENSATION

(71) Applicant: Zoox, Inc., Foster City, CA (US)

(72) Inventor: Kazuhide Okamoto, San Mateo, CA (US)

(73) Assignee: Zoox, Inc., Foster City, CA (US)

(*) Notice: Subject to any disclaimer, the term of this patent is extended or adjusted under 35 U.S.C. 154(b) by 349 days.

(21) Appl. No.: 17/240,365

(22) Filed: Apr. 26, 2021

(51) Int. Cl.
*B60W 60/00* (2020.01)
*B60W 10/22* (2006.01)
*B60W 30/06* (2006.01)
*B60W 40/02* (2006.01)
*G05D 1/00* (2006.01)

(52) U.S. Cl.
CPC ...... *B60W 60/00182* (2020.02); *B60W 10/22* (2013.01); *B60W 30/06* (2013.01); *B60W 40/02* (2013.01); *B60W 60/0023* (2020.02); *G05D 1/0088* (2013.01); *G05D 1/0217* (2013.01); *G05D 1/0255* (2013.01); *B60W 2420/54* (2013.01); *B60W 2555/20* (2020.02); *B60W 2710/223* (2013.01)

(58) Field of Classification Search
CPC .......... B60W 60/00182; B60W 10/22; B60W 30/06; B60W 40/02; B60W 60/0023; B60W 2420/54; B60W 2555/20; B60W 2710/223; G05D 1/0088; G05D 1/0217; G05D 1/0255; G05D 2201/0213
USPC .......................................................... 701/36
See application file for complete search history.

(56) References Cited

U.S. PATENT DOCUMENTS

2007/0038336 A1* 2/2007 Yamamura ............ B60W 40/02
701/1
2013/0282946 A1* 10/2013 Ricci ................... G06F 13/4221
710/306
(Continued)

FOREIGN PATENT DOCUMENTS

TW M536955 U 2/2017

OTHER PUBLICATIONS

Office Action for U.S. Appl. No. 17/240,443, mailed on Feb. 2, 2023, Okamoto, "Vehicle Control Based On Wind Compensation", 32 pages.
(Continued)

*Primary Examiner* — Tuan C To
*Assistant Examiner* — Dominick Mulder
(74) *Attorney, Agent, or Firm* — Lee & Hayes, P.C.

(57) ABSTRACT

Techniques for determining environmental data of an environment associated with a vehicle are discussed herein. The vehicle can use the data to determine a vehicle configuration data, a trajectory for the vehicle to traverse, a route to a destination, or orientation for ingress/egress. The vehicle can determine control data based on the vehicle configuration data, the trajectory, or the route. The vehicle configuration data may be associated with a setting of a suspension component, a speed, or other component. The trajectory may be biased based on a source of the wind. The route may be selected from a first candidate route and a second candidate route using a first wind score associated with the first candidate route and a second score associated with the second candidate route. The vehicle can use a sensor, such as a wind sensor, to capture or otherwise determine the wind data.

20 Claims, 9 Drawing Sheets

(56) References Cited

U.S. PATENT DOCUMENTS

| | | | | |
|---|---|---|---|---|
| 2014/0018980 | A1* | 1/2014 | Bollapragada | G08G 5/0091 |
| | | | | 244/180 |
| 2017/0090478 | A1* | 3/2017 | Blayvas | G06Q 10/04 |
| 2017/0213459 | A1* | 7/2017 | Ogaz | G08G 1/166 |
| 2017/0251589 | A1* | 9/2017 | Tippery | A01B 51/02 |
| 2017/0334444 | A1* | 11/2017 | Hawes | B60W 40/02 |
| 2017/0361868 | A1* | 12/2017 | Guy | B60W 40/13 |
| 2018/0022345 | A1 | 1/2018 | Seo | |
| 2018/0037259 | A1* | 2/2018 | Hawes | G01C 19/44 |
| 2018/0162400 | A1* | 6/2018 | Abdar | B60W 10/04 |
| 2018/0210447 | A1 | 7/2018 | Myers | |
| 2018/0371822 | A1 | 12/2018 | Rrumbullaku | |
| 2019/0114564 | A1* | 4/2019 | Ferguson | B64C 39/02 |
| 2019/0145794 | A1* | 5/2019 | Ketchell, III | G01C 21/3667 |
| | | | | 701/439 |
| 2019/0164363 | A1* | 5/2019 | Javid | B62D 15/021 |
| 2020/0010077 | A1* | 1/2020 | Cormack | B60R 21/01 |
| 2020/0047745 | A1* | 2/2020 | Suzuki | G06V 10/764 |
| 2020/0156623 | A1 | 5/2020 | Takaue | |
| 2020/0276987 | A1* | 9/2020 | Yamane | G06V 20/586 |
| 2020/0285235 | A1 | 9/2020 | Yamane et al. | |
| 2020/0353935 | A1* | 11/2020 | Menne | B60W 40/08 |
| 2021/0094533 | A1* | 4/2021 | Yoon | B60W 40/06 |
| 2021/0221357 | A1 | 7/2021 | Woolliscroft et al. | |
| 2022/0089189 | A1 | 3/2022 | Pandit | |
| 2022/0126867 | A1* | 4/2022 | Han | G01P 5/00 |
| 2022/0179096 | A1 | 6/2022 | Hoehenberger | |

OTHER PUBLICATIONS

Office Action for U.S. Appl. No. 17/240,443, mailed on Jun. 1, 2023, Okamoto, "Vehicle Control Based On Wind Compensation", 30 pages.

Office Action for U.S. Appl. No. 17/240,443, mailed on Jan. 5, 2024, Kazuhide Okamoto, "Vehicle Control Based On Wind Compensation", 26 pages.

* cited by examiner

TRAJECTORY MODIFICATION BASED ON WIND COMPENSATION

BACKGROUND

Environmental factors can affect operation of a vehicle. For example, wind can affect an immediate trajectory of the vehicle navigating within an environment and affect an overall energy cost of a vehicle during a trip.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
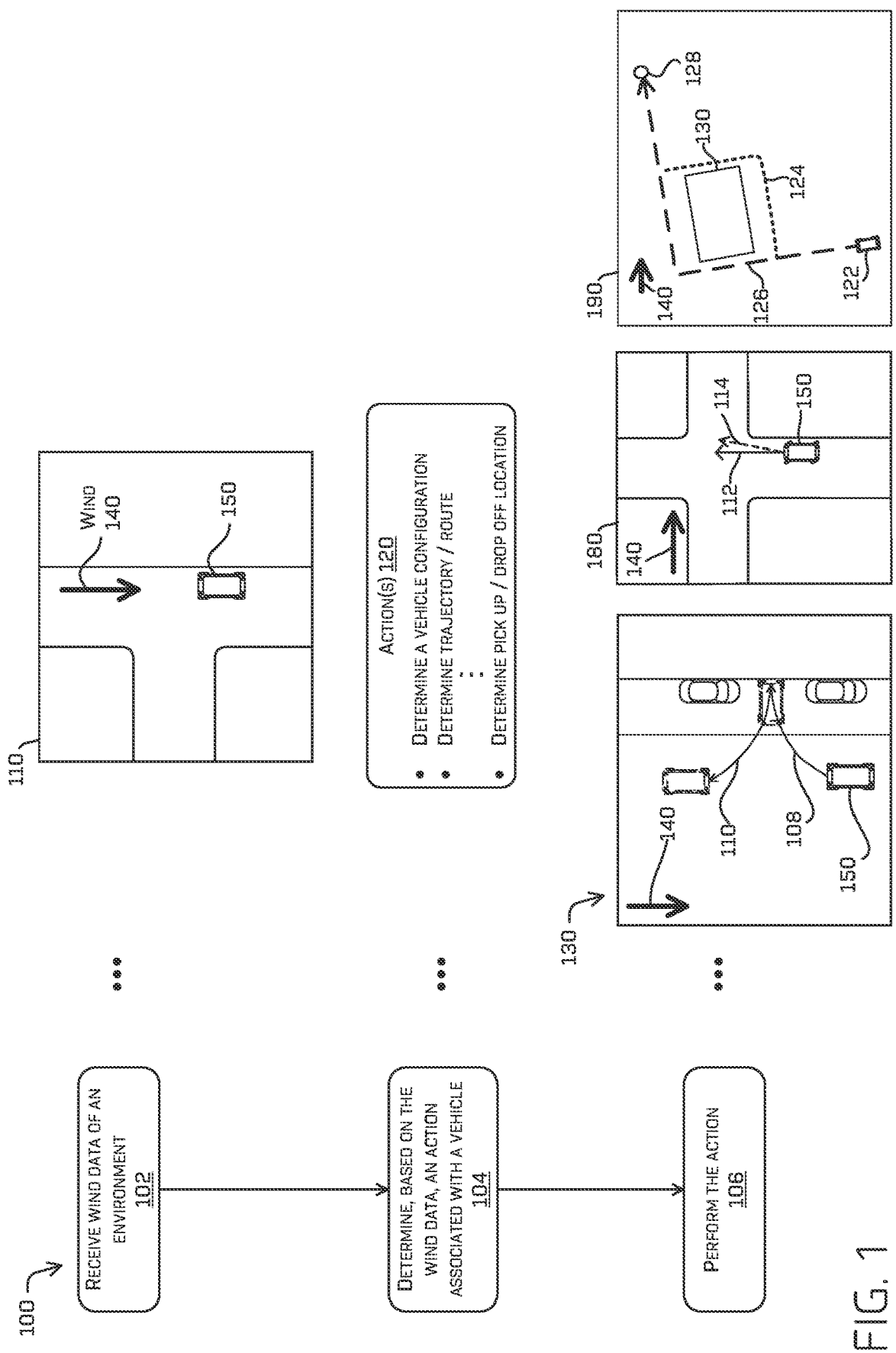
FIG. 1 is a pictorial flow diagram of an example process of receiving wind data of an environment and determining an action based on the wind data.

Techniques for determining a vehicle operation based on wind data or other environmental data are discussed herein. Weather conditions such as wind, rain and/or snow may affect the trajectory and/or the energy used by the vehicle while navigating within an environment, which may lead to inefficiencies in vehicle operation.

In some examples, a vehicle may include a sensor capturing sensor data. The sensor data can represent, or otherwise be used to determine, wind data. The wind data can include a relative speed of the wind based on a speed and/or a trajectory of the vehicle. The wind data can further include an absolute wind speed based on a speed of the vehicle and the relative speed of the wind. A reference trajectory of the vehicle can be received. The reference trajectory may correspond to an initial and/or ideal route for the vehicle to traverse through an environment, such as a centerline of a road segment. The vehicle can compensate for the wind by changing an orientation of the wheels relative to the body of the vehicle or changing an orientation of the body of the vehicle relative to the reference trajectory (e.g., a direction toward a source of the wind).

In some examples, a direction of the wind proximate to the vehicle can be determined. Examples of sensors that can measure the direction of the wind are discussed in additional details in connection with FIG. 2 below, as well as throughout this disclosure. A vehicle configuration can be determined based on the direction of the wind, such configuration comprising, for example, suspension settings, an amount and/or direction of crabbing, velocity, heading, etc. In those examples in which the configuration comprises a suspension component of the vehicle, the suspension component of a downwind portion of the vehicle can be stiffened or otherwise adjusted relative to a setting of a suspension component of an upwind portion of the vehicle in order to keep the vehicle from rolling over due to a rolling force generated by the wind. Alternatively, the suspension component of both sides of the vehicle can be stiffened.

In some examples, wind data can be captured or otherwise received from a sensor separate from a vehicle or can be received from a database representing wind data (both historical and contemporaneous). An initial position of the vehicle can be determined. The initial position may correspond to a pick-up location for a passenger. The vehicle can receive a destination. The destination may correspond to a drop off location for a passenger. A first candidate route and a second candidate route can be determined based on the initial position and the destination. The first candidate route and the second candidate route may correspond to different routes the vehicle can travel along from the initial position to the destination. A first wind score associated with the first candidate route and a second wind score associated with the second candidate route can be determined based on the wind data. The first wind score and the second wind score may correspond to a measure of an energy efficiency of the vehicle or a wind exposure of the vehicle along the first candidate route and the second candidate route respectively. One of the first candidate route or the second candidate route can be selected for the vehicle to travel along based on the first wind score and the second wind score.

In some examples, a vehicle can receive weather data. The weather data may be indicative of wind, snow, and/or rain in an environment associated with the vehicle. The vehicle can receive information indicative of a destination. The destination may correspond to a pick-up location or a drop-off location. The vehicle can receive a map data or a sensor data. A parking location can be determined based on the destination and the map data or the sensor data. A trajectory for the vehicle to traverse to the parking location can be determined based on the weather data and the parking location. An orientation of the vehicle associated with the parking location can be determined based on the trajectory. The door of the vehicle to open can be determined based on the weather data and the orientation. The door may correspond to where a passenger can enter or depart from the vehicle that provide the most amount of cover from the weather. For example, a trajectory can be determined that orients the vehicle perpendicular or substantially perpendicular to the wind such that a door on a downwind side of the vehicle can be opened and allow the passengers to be protected from the elements during ingress and/or egress.

In some examples, a vehicle can receive weather data and sensor data. The vehicle can use weather data and sensor data to orient the vehicle to minimize an effect of the weather on a passenger when picking up or dropping off the passenger at a pick-up location or a drop-off location. The pick-up location or the drop-off location may be a parking location. A size of a parking location can be determined based at least in part on the sensor data. A parallel parking maneuver or a bidirectional maneuver can be determined based at least on the size and the weather data. The parallel parking maneuver or the bidirectional maneuver may correspond to a parking maneuver the vehicle uses to enter the parking location. For example, a parallel parking maneuver can include the "front" of the vehicle remaining the same throughout the parking maneuver, while the bidirectional parking maneuver can include the "front" of the vehicle changing throughout the maneuver, such that the vehicle enters the parking location with the "front" associated with a first side of the vehicle and exits the parking location with the "front" associated with a second side of the vehicle opposite the first side. The vehicle can select, based on the size of the parking location and the weather data, the parallel parking maneuver or the bidirectional maneuver as the parking maneuver.

In some examples, a vehicle can receive sensor data. An obstacle in an environment can be determined based on the sensor data. The obstacle may correspond to an object in the environment that may affect a passenger of the vehicle from entering or departing from the vehicle. Examples of such obstacles may include, but is not limited, a puddle, snow, ice, rain, debris, or a dynamic object such as a bicyclist, other vehicles, pedestrians, and the like. A parking location of the vehicle can be determined based at least in part on the obstacle. The parking location may correspond to a pick-up location or a drop-off location.

In some examples, a vehicle can receive a wind data, a map data, and an image data. A location associated with shelter from the wind can be determined based at least in part on the wind data and the map data and/or the image data. A parking location can be determined based at least in part on the location. The parking location may correspond to a pick-up location. An indication of the parking location can be sent to a user device associated with a passenger. The indication may correspond to a pin or other marker on a map associated with the user device or a route for navigating the passenger to the parking location.

The vehicle operation techniques described herein can improve a functioning of a vehicle by providing a robust method of determining a vehicle configuration data, determining a trajectory for the vehicle, and/or determining a route to a destination. In the context of vehicle configuration data, the techniques discussed herein can adjust a stiffness of a suspension. Adjusting the suspension may result in a safer vehicle operation and an improved passenger experience. In the context of determining a trajectory, determining the trajectory based on wind data allows the vehicle to compensate for the wind and allow the vehicle to create a more accurate dynamic model to improve the instantaneous energy efficiency of the vehicle and lessen the wear on the mechanical parts of the vehicle. In the context of determining the route, the vehicle can select the most energy efficient route which may reduce the number of times the vehicle needs to be recharged or refueled between trips and allow the vehicle to operate for longer durations or over larger distances. These and other improvements to the functioning of the vehicle are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques can be utilized in aviation context, in an aerial surveying context, or in a nautical context. Additionally, the techniques described herein can be used with real data (e.g., captured using sensor(s)), simulated data (e.g., generated by a simulator), or any combination of the two.

FIG. 1 is a pictorial flow diagram of an example process 100 of receiving wind data of an environment, determining, based on the wind data, an action associated with a vehicle, and performing the action.

An operation 102 can include receiving wind data of an environment. An example of such wind data is illustrated in example 110 as wind 140. As illustrated in the example 110, the wind 140 includes a wind direction and a wind speed. Further, the operation 102 can include receiving wind data from a single sensor or multiple sensors. The operation 102 can include receiving wind data associated with a single time or wind data captured over a period of time. Further, operation 102 can include receiving sensor data other than wind data such as image data, which can be used to estimate a direction and/or speed of the wind or a state of the environment include rain, etc. In some examples, the operation 102 can include receiving environmental data, which may include data associated with wind, temperature, humidity, rain, snow, hail, etc. In some examples, the operation 102 can be performed by an autonomous vehicle, such as vehicle 150 of example 110, as it traverses the environment. Additional details of operation 102 are discussed in connection with FIGS. 2-6, as well as throughout this disclosure.

An operation 104 can include determining, based on the wind data, an action associated with a vehicle. An example of such action is illustrated as example action(s) 120. Example action(s) 120 can include, but are not limited to, determining a vehicle configuration, determining a trajectory and/or a route, determining a pick-up location and/or a drop-off location, and the like.

In some examples, the operation 104 can include determining an initial position of the vehicle, which may be the pick-up location, a destination, which may be the drop-off location. In some examples, operation 104 can include determining a first candidate route, a second candidate route, both candidate routes may be based at least in part on a map data. In some examples, operation 104 can include determining a candidate trajectory, which may be based at least in part on a reference trajectory. In some examples, a trajectory or route may be referred to generally as vehicle steering control data. In some examples, operation 104 can include determining a parking location of the vehicle, which may be the drop-off location or the pick-up location. Operation 104 can further include determining an orientation of the vehicle associated with the parking location. In some examples, operation 104 can include determining a parking maneuver the vehicle uses to enter the parking location, which may be a parallel parking maneuver or a bidirectional maneuver. In some examples, operation 104 can include a door of the vehicle to open, which may be where the passenger enters or departs the vehicle. In some examples, operation 104 can include an obstacle in an environment, which may be an object in the environment that may affect a passenger from entering or departing the vehicle, and the like. Details of operation 104 are discussed in connection with FIGS. 2-6, as well as throughout this disclosure.

An operation 106 can include performing the action determined in operation 104. An example of operation 106 is illustrated as example 130. Example 130 illustrates a vehicle 150 determining a first trajectory 108 entering a parking location and a second trajectory 110 exiting the parking location. Further, the vehicle 150 can determine a size of the parking location and based at least on the size, the vehicle 150 can determine a parking maneuver the vehicle 150 can use to enter and leave the parking location. As illustrated by example 130, the parking maneuver selected by the vehicle can be a bidirectional parking maneuver, although other maneuvers may be selected or determined, as discussed herein. The vehicle 150 performs the bidirectional maneuver by entering the parking location along the first trajectory 108 and, without physically moving the vehicle 150 in the parking location, switches its front, while in the parking location, from a direction of the first trajectory 108 to a direction of the second trajectory 110, such that the vehicle 150 is traveling forward when leaving the parking location along the second trajectory 110. Further, the vehicle receives wind data associated with wind 140 and determines a door of the vehicle 150 that is downwind to the wind 140 is to be opened in order to provide wind cover to a passenger entering or departing from the vehicle 150. Further, operation 106 can include controlling the vehicle based at least in part on the action. Details of example 130 are discussed in connection with FIG. 4, as well as throughout this disclosure.

Another example of operation 106 is illustrated as example 180. Example 180 illustrates a vehicle 150 with a reference trajectory 112, which may correspond to an initial or ideal route for vehicle 150 to traverse through an environment, such as a centerline of a road segment. Example 180 further includes wind 140. Wind 140 can affect vehicle 150 by generating a force that pushes vehicle 150 in a direction along a predicted trajectory 114 (e.g., without compensating for the wind). Vehicle 150 can determine an orientation of the wheels of the vehicle where a steering angle is biased toward wind 140 and sufficient to compensate for the force generated by wind 140. Details of example 180 are discussed in connection with FIG. 2, as well as throughout this disclosure.

Another example of operation 106 is illustrated as example 190. Example 190 illustrates a vehicle at an initial location 122 traveling toward a destination 128. The vehicle, based on the destination, determines a first candidate route 124 and a second candidate route 126, and selects the first candidate route 124 or the second candidate route 126 to traverse along based on wind data of wind 140. In some examples, the vehicle can select the more energy efficient of first candidate route 124 or second candidate route 126. In some examples the first candidate route 124 is the more energy efficient route because when the vehicle traverses along the first candidate route 124, structure 130 blocks wind 140 along a part of first candidate route 124 while second candidate route 126 is vulnerable to wind 140. In some examples, the details of example 190 are discussed in connection with FIG. 3, as well as throughout this disclosure.

Figure 2:
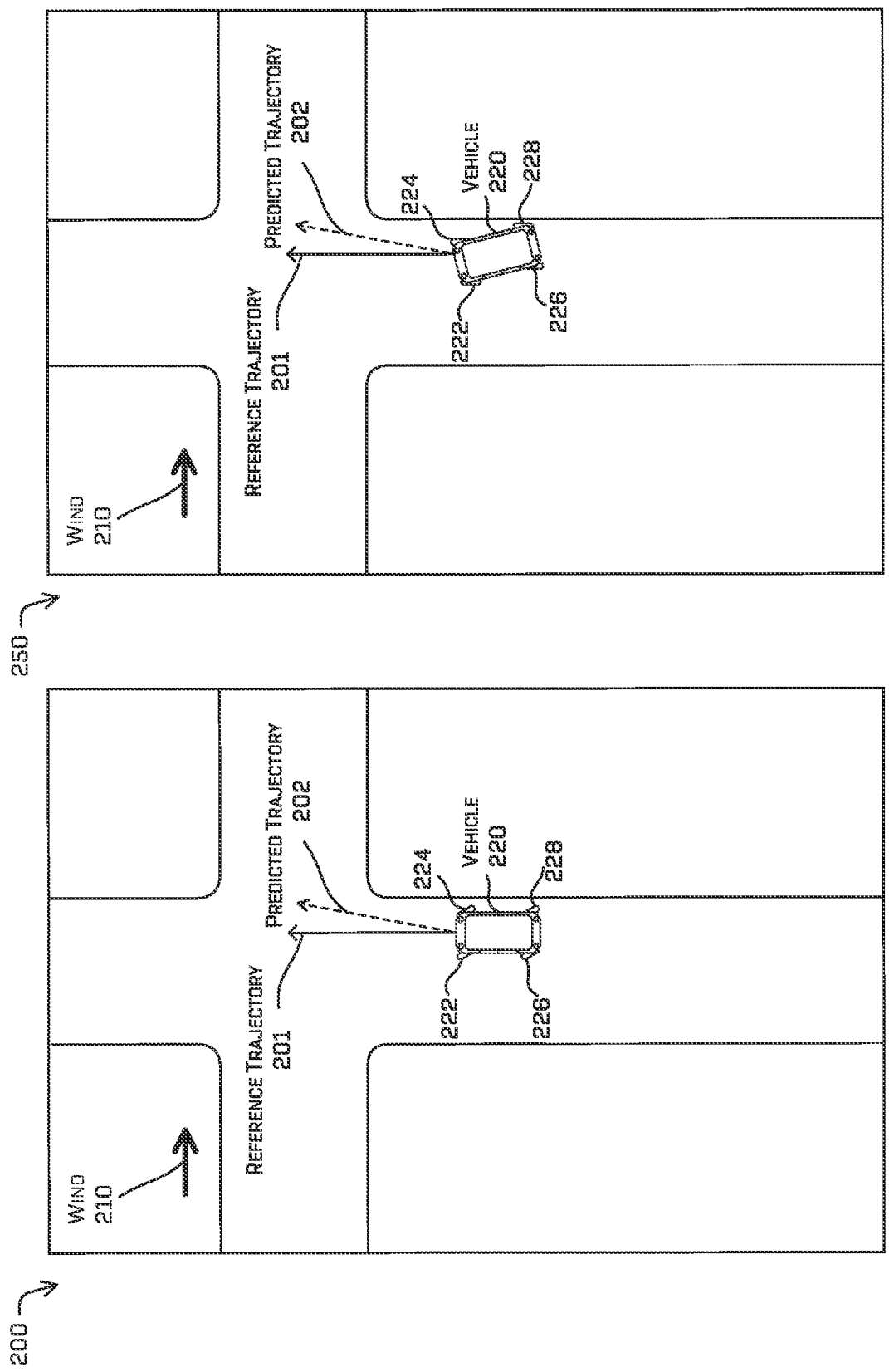
FIG. 2 is an illustration of an example of determining a trajectory of a vehicle based on wind data.

FIG. 2 is an illustration of example 200 of determining a trajectory of a vehicle.

The example 200 illustrates a top-down view of a vehicle 220, which may be an autonomous vehicle, traversing through an environment. The vehicle 220, which may correspond to vehicle 150 of example 180, can receive a reference trajectory 201, which may correspond to an initial or ideal route for vehicle 220 to traverse through the environment, such as a centerline of a road segment. Reference trajectory 201 may correspond to reference trajectory 112 of example 180. Example 200 further includes a wind 210. Wind 210 includes a wind speed and a wind direction. The wind direction is represented by an arrow in example 200. Wind 210 can affect vehicle 220 by generating a force that pushes the vehicle 220 in a direction along a predicted trajectory 202 (e.g., without compensating for the wind). Predicted trajectory 202 may correspond to predicted trajectory 114 of example 180.

The vehicle 220 can receive wind data associated with wind 210. The wind data can be captured by a sensor. Alternatively, the sensor may be separate from the vehicle 220. The sensor can be integrated into, attached to, or otherwise associated with the vehicle 220. The sensor can be one or more of an ultrasonic wind sensor, an anemometer, a pitot tube, an audio sensor, and the like. The audio sensor may be a microphone and the like. In some examples, the sensor can detect a relative velocity of wind 210 while the vehicle is traversing along reference trajectory 201. In some examples, an absolute velocity of wind 210 may be determined based on a velocity of the vehicle and the relative velocity of the wind. Vehicle 220 can alternatively receive the wind data from a database representing historical and/or contemporaneous wind data. The historical and/or contemporaneous wind data can correspond to aggregated wind data collected by vehicle 220 over time, at least one vehicle other than vehicle 220 over time, the vehicle 220 and at least one vehicle other than vehicle 220 over time, or meteorological data collected from external sources. Examples of external sources may be, but are not limited to, the National Weather Service, the Weather Channel, and/or Accuweather. The wind data can include wind speed and/or wind direction. Vehicle 220 can determine, based on the wind data and the reference trajectory 201, an amount of crabbing of vehicle 220. The amount of crabbing may correspond to an orientation of wheel 222, an orientation of wheel 224, an orientation of wheel 226, and an orientation of wheel 228, wherein each orientation is relative to the body of vehicle 220 and biased in a direction toward a source of the wind and sufficient to compensate for the force and ensure vehicle 220 continue to traverse along reference trajectory 201. In some examples, the wind data can be used as a cost when determining the orientation of wheels 222, 224, 226, and/or 228. In some examples, the orientation of wheels 222, 224, 226, and 228 are the same orientation. In some examples, the orientation of wheels 222, 224, 226 and 228 are different orientations. Vehicle 220 can determine, based on at least in part on the orientation of wheel 222, 224, 226, and/or 228, a control data. In some examples, during crabbing, an orientation of the body of vehicle 220 may be substantially parallel with reference trajectory 201.

Example 250 alternatively illustrates vehicle 220 determining, based on the wind data and the reference trajectory 201, a heading of vehicle 220. The heading of vehicle 220 may correspond to an orientation of the body of vehicle 220 relative to reference trajectory 201. The orientation of the body of vehicle 220 is biased toward the source of the wind while the orientation of wheels 222, 224, 226, and 228 are substantially parallel with reference trajectory 201. The orientation of the body can be in an angle between 0 degrees and 90 degrees. Vehicle 220 can determine, based at least in part on the orientation of the body, the control data.

Alternatively, vehicle 220 can determine a candidate trajectory based on the wind data and reference trajectory 201. The candidate trajectory can be biased in the direction toward the source of wind 210 and sufficient to compensate for the force generated by wind 210 and redirect the vehicle from predicted trajectory 202 back to reference trajectory 201. Examples of determining a candidate trajectory can be found can be found, for example, in U.S. patent application Ser. No. 16/179,679 titled "Adaptive Scaling in Trajectory Generation" and filed Nov. 2, 2018, the entirety of which is herein incorporated by reference in its entirety for all purposes. Vehicle 220 can determine, based at least in part on the candidate trajectory, the control data.

In some examples, the vehicle 220 can include 2, 3, 4, or more wheels. In some example, the vehicle 220 can steer some, or all of wheels 222, 224, 226, and 228 independently. In some examples, controlling the vehicle 220 based on the control data can include changing the steering angle at least one of wheels 222 or 224 biased in the direction toward the source of the wind between 0 degrees and 90 degrees. Further, controlling the vehicle 220 can include changing the steering angle of at least one of wheels 222 or 224 and changing the steering angle of at least one of wheels 226 or 228.

In some examples, the vehicle 220 may be a two wheeled vehicle configured with one front wheel and one back wheel. Controlling vehicle 220 can include changing the steering angle of only the front wheel or the steering angle of both wheels.

In some examples, the vehicle 220 may be a three wheeled vehicle configured with one front wheel and two back wheels. Controlling the vehicle 220 along the candidate trajectory can include steering only the front wheel or steering all three wheels. Alternatively, the three wheeled vehicle may be configured with two front wheels and one back wheel.

In some examples, the vehicle 220 may be a four wheeled vehicle configured with two front wheels and two back wheels as illustrated in FIG. 2. Controlling the vehicle 220 can include changing the steering angle of only the two front wheels or changing the steering angle of all four wheels.

In some examples the vehicle 220 may be a vehicle configured with more than four wheels. Controlling the vehicle 220 can include changing the steering angle of only the front wheels or changing the steering angle of all of the wheels.

Examples of four wheeled vehicle steering can be found, for example, in U.S. Pat. No. 10,759,416, titled "Independent Control of Vehicle Wheels" and issued Sep. 1, 2020, the entirety of which is herein incorporated by reference in its entirety for all purposes.

Alternatively or in addition, vehicle 220 can determine, based at least in part on the wind data, a vehicle configuration data.

In some examples, the sensor can detect, based on a pose of vehicle 220, a motion of the body of vehicle 220, wherein the motion includes six degrees of freedom. Vehicle 220 can determine, based on the wind data, a lateral force on the vehicle generated by wind 210. Vehicle 220 can determine, based at least on the lateral force and the motion of the body of vehicle 220, a roll angle of vehicle 220. Vehicle 220 can determine, based on the roll angle, a vehicle configuration data configured to mitigate the roll angle. The vehicle configuration data can be a setting associated with a suspension component of vehicle 220. The setting can be stiffening the suspension component on a side of vehicle 220 that is downwind (and/or upwind) of the wind direction. Alternatively or in addition, the setting can be softening the suspension component of the side of the vehicle 220 that is upwind (and/or downwind). Alternatively or in addition, the setting can be stiffening all suspension components on both sides of vehicle 220. Alternatively or in addition, the setting can be lowering the height of the suspension component in order to lower the height of vehicle 220. Each suspension component can be independently controlled. The setting can be applied to at least one of a front suspension or a back suspension. The control data can be controlling the suspension component based on the setting, Alternatively or in addition, the vehicle configuration data can include a setting associated with the caster, the camber, and/or the toe of one or more wheels of vehicle 220, such as wheels 222, 224, 226 and/or 228. Such adjustments may be made to ensure that the vehicle continues along the desired path to compensate for external forces applied by environmental conditions and/or to minimize an amount of energy required to traverse through such environmental conditions, provide increased stability (such as when driving in icy or rainy conditions), or the like.

In some examples, the vehicle configuration data may include a position of at least one passenger located inside the vehicle 220. If the vehicle 220 is carrying at least one passenger, the position of the at least one passenger may change the predicted trajectory 202 compared to the predicted trajectory 202 when the vehicle 220 is empty. In some examples, one or more passengers inside vehicle 220 increases an overall weight of vehicle 220 and therefore lessens an impact of wind 210 on vehicle 220 compared to an empty vehicle 220. In some examples, when one or more passengers is inside vehicle 220, the orientation of wheels 222, 224, 226, and/or 228 and/or the orientation of the body of vehicle 220 may be on a more acute angle than when vehicle 220 is empty.

In some examples, the vehicle configuration data may include the amount of crabbing of vehicle 220 and the amount of heading of vehicle 220 as described herein. In some examples, the vehicle configuration data may include vehicle velocity. In some examples, the vehicle configuration data may include data corresponding to a drag from an aerial environment and/or a drag from a ground environment.

Figure 3:
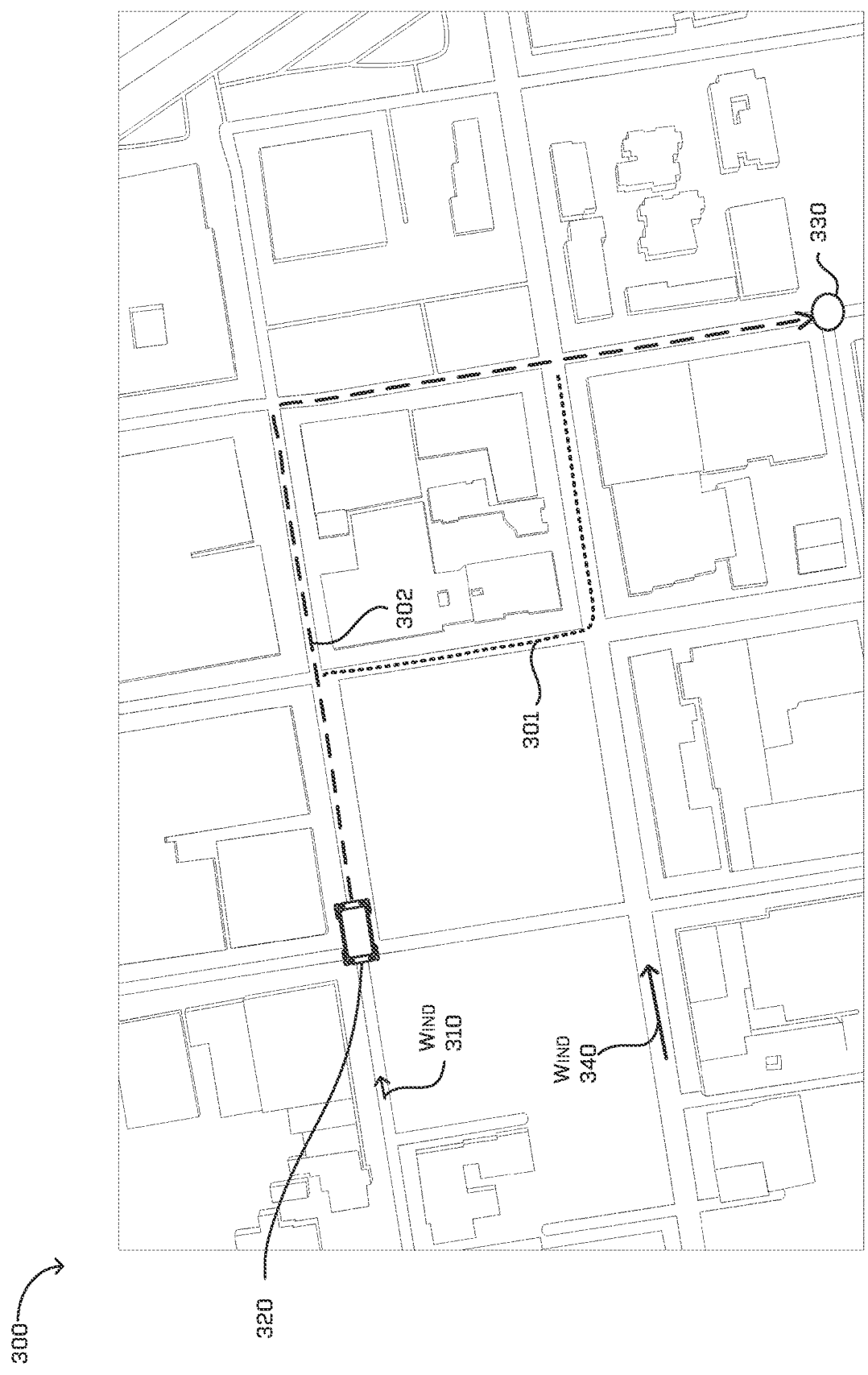
FIG. 3 is an illustration of an example of determining a route based on the wind data.

FIG. 3 is an illustration of an example 300 of determining a route of a vehicle.

Example 300 illustrates a map view of routes between an initial location 320 and a destination 330. In some cases, the initial location 320 may correspond to initial location 122 of example 190. In some cases, the destination 330 may correspond to destination 128 of example 190. The initial location 320 may correspond to a pick-up location. The destination 330 may correspond to a drop-off location. Both the initial location 320 and the destination 330 may be received by a vehicle from a user device associated with a passenger. Alternatively, the initial location 320 may be received by a vehicle from the user device, but the destination may be inputted by a user using an input device inside the vehicle. The input device may be a console, a touchpad, a touch screen, a touch panel, a keyboard and mouse integrated with, attached to, or otherwise associated with a display, and the like. Example 300 further includes first wind 310 and second wind 340. First wind 310 includes a first wind direction and/or a first wind speed. Second wind 340 includes a second wind direction and/or a second wind speed. The wind direction and wind speed are illustrated by arrows in example 300, wherein a longer arrow represents a faster wind speed, and a shorter arrow represents a slower wind speed. A vehicle, which may be an autonomous vehicle, can determine, based at least in part on the initial location 320 and the destination 330, a first candidate route 301 and a second candidate route 302 that the vehicle can traverse on between the initial location 320 and the destination 330. First candidate route 301 and second candidate route 302 may correspond to first candidate route 124 and second candidate route 126 of example 190 and to roads between the initial location 320 and the destination 330.

The vehicle can receive wind data associated with the wind 310. The wind data can be captured by a sensor. The sensor can be integrated into, attached to, or otherwise associated with the vehicle. The sensor can be one or more of an ultrasonic wind sensor, an anemometer, a pitot tube, an audio sensor, and the like. The audio sensor may be a microphone and the like. Alternatively, the sensor may be separate from the vehicle. In some examples, wind data can be captured by individual sensors of a fleet of vehicles and aggregated to determine contemporaneous wind data throughout an environment, such as a city. In some examples, wind data can be aggregated from one or more external sources of meteorological data. Examples of sources of meteorological data may include, but not limited to, data from the National Weather Service or other Internet-based weather data sources.

The vehicle can alternatively receive the wind data from a database representing historical wind data. The historical wind data can include at least one of the wind speed or the wind direction or both the wind speed and the wind direction. The historical wind data can correspond to aggregated wind data collected by vehicle over time, at least one vehicle other than vehicle over time, the vehicle and at least one vehicle other than vehicle over time, and/or meteorological data as described herein. Historical wind data may represent wind trends of the environment over a period of months and/or years. In some examples, in the absence of contemporaneous wind data, the historical wind data may be used to select one of first candidate route 301 or second candidate route 302. In some examples, the historical wind data can supplement the contemporaneous wind data in selecting one of first candidate route 301 or second candidate route 302.

At the initial location 320, the vehicle can determine, based at least on the wind data, a first wind score associated with the first candidate route 301 and a second wind score associated with the second candidate route 302. The first wind score and the second wind score may correspond to a measure of energy efficiency of the vehicle traversing the first candidate route and the second candidate route respectively and/or may correspond to a level of a wind exposure of the vehicle along the first candidate route and the second candidate route respectively. The vehicle can select or otherwise determine, based at least on the first wind score and the second wind score, one of the first candidate route 301 or the second candidate route 302 to traverse along. In some examples, the first wind score is indicative of a first energy efficiency and the second wind score is indicative of a second energy efficiency, and the vehicle selects the first candidate route 301 and the second candidate route 302 based on the higher of the first energy efficiency and the second energy efficiency. Examples of determining an optimal route using costs or scores, such as the wind score, can be found, for example, in U.S. Pat. No. 10,353,390, titled "Trajectory Generation and Execution Architecture" and issued Jul. 16, 2019, the entirety of which is herein incorporated by reference in its entirety for all purposes.

In some examples, the vehicle selects one of the first candidate route 301 or the second candidate route 302 based on the lower of the first wind score or the second wind score. The lower of the first wind score or the second wind score may correspond to a route associated with the measure of energy efficiency being the highest and/or may correspond to a route associated with the level of wind exposure being the lowest. The measure of energy efficiency and the level of wind exposure may correspond to whether the wind direction may correspond to a tailwind, a headwind or a crosswind, the wind velocity corresponding to a fast velocity or a slow velocity, whether one or more buildings can shield the vehicle from the wind 310, and the like.

In some examples, the wind speed and direction may be based on the arrows illustrated in Example 300. In some examples, because first wind 310 has a slower wind speed (shorter arrow) and second wind 340 has a faster wind speed (longer arrow), the vehicle determines that the first wind score is lower than the second wind score because the first candidate route 301 passes along a route containing a faster tailwind while the second candidate route 302 passes along a route containing a slower tailwind. Because the first wind score is lower, the vehicle selects the first candidate route 301 to traverse along.

Figure 4:
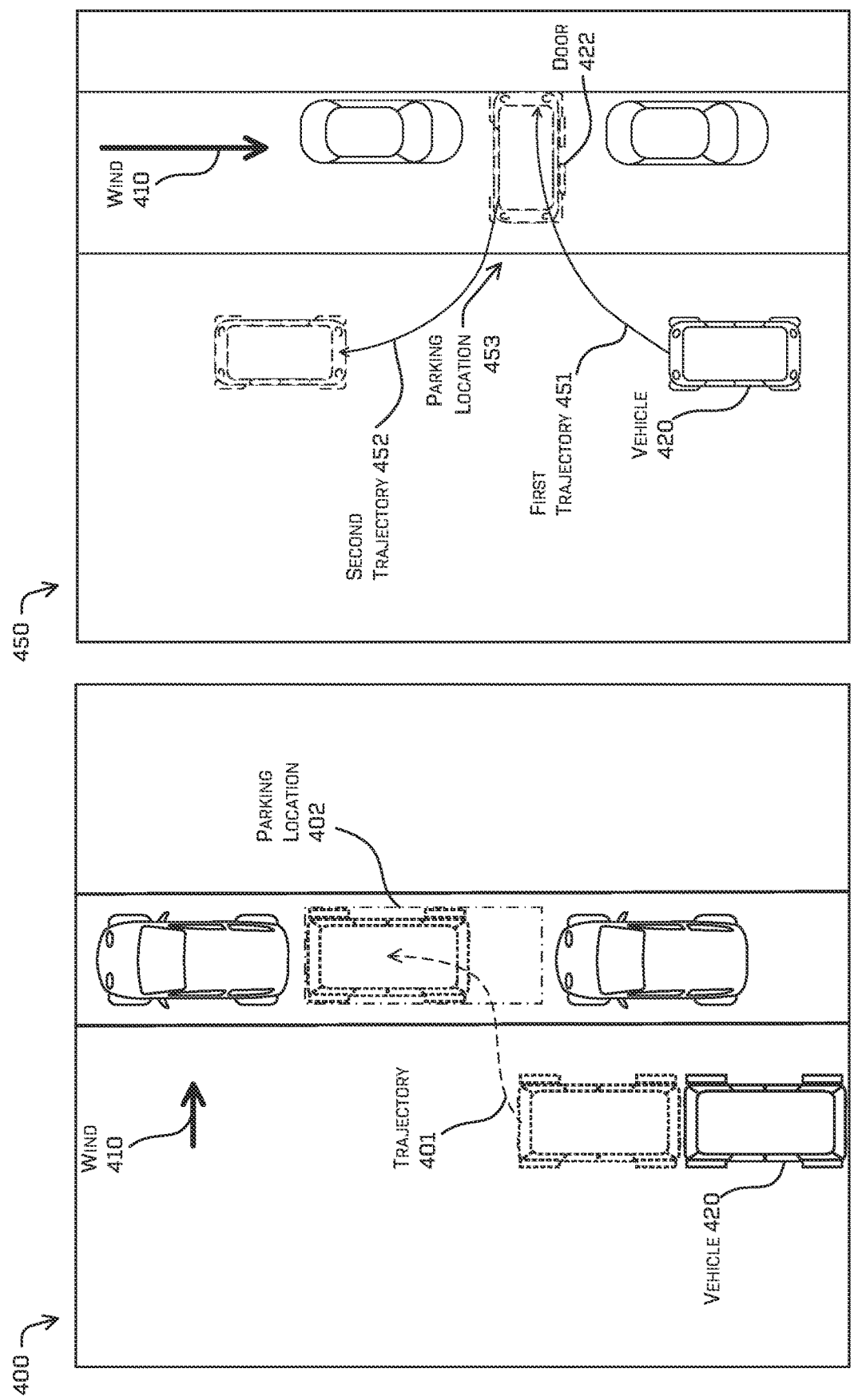
FIG. 4 illustrates various parking maneuvers based on wind data.

FIG. 4 are illustrations of examples 400 and 450 of a parking maneuver based on wind data. Examples of the parking maneuver may be, but not limited to, a parallel parking maneuver and/or a bidirectional maneuver.

Example 400 illustrates a top-down view of the parking maneuver corresponding to the parallel parking maneuver associated with a vehicle 420. Example 400 further includes a wind 410. Wind 410 includes a wind direction and/or a wind speed. The wind direction is illustrated by an arrow in example 400. Vehicle 420 can receive wind data associated with the wind 410. The wind data can be captured by one or more sensors. The one or more sensor may be separate from the vehicle or can be integrated into, attached to, or otherwise associated with the vehicle. The one or more sensor may be one or more of an ultrasonic wind sensor, an anemometer, a pitot tube, an audio sensor, and the like.

Vehicle 420, which may be an autonomous vehicle, can receive a destination. The destination may correspond to a pick-up location or a drop-off location. Vehicle 420 can determine, based at least in part on the destination and the wind data, a parking location 402 for vehicle 420. Vehicle 420 can determine, based at least in part on the wind data and the parking location, a trajectory 401 for vehicle 420 to traverse to the parking location 402. In the parallel parking maneuver, vehicle 420 can enter and depart from the parking location 402 where a front of vehicle 420 maintains a same direction when vehicle 420 enters the parking location 402 and when the vehicle departs from the parking location 402. Vehicle 420 can determine, based on data from the one or more sensors, a size of the parking location 402. Vehicle 420 can determine, based at least in part on the wind data and the size of the parking region, an orientation of vehicle 420 where one side of vehicle 420 is downwind of wind 410 and/or shields a passenger from wind 410. The orientation may be at an angle between, but not limited to, 0 degrees and 90 degrees on either side of vehicle 420 in order to keep one side of vehicle 420 downwind of wind 410 and/or shield the passenger from wind 410. Further, vehicle 420 can control a door (e.g., door 422) on the side of vehicle 420 downwind of wind 410 so that when vehicle 420 is oriented in the orientation, the passenger entering or departing from vehicle 420 can be protected from wind 410.

Example 450 illustrates a top-down view of the parking maneuver corresponding to the bidirectional maneuver. Example 450 illustrates a vehicle 420, which may be an autonomous vehicle, determining a first trajectory 451 for entering a parking location 453 and a second trajectory 452 for exiting the parking location 453. Further, vehicle 420 can determine, based on a sensor data from the one or more sensors, a size of the parking location 453. Example 450 further includes wind 410. Wind 410 includes a wind direction and a wind speed. The wind direction is illustrated by an arrow in example 400. Vehicle 420 performs the bidirectional maneuver by entering the parking location along the first trajectory 108 and, without physically moving vehicle 420 in the parking location, switches its front, while in the parking location 453, from a direction of the first trajectory 451 to a direction of the second trajectory 452, such that vehicle 420 is traveling forward when leaving the parking location along the second trajectory 452. In some examples, vehicle 420 may control one or more lights of the vehicle to change a color of the lights of head lights to tail lights, and vice versa, in connection with the bidirectional parking maneuver.

Further, vehicle 420 receives wind data associated with wind 410. Wind 410 includes a wind direction and/or a wind speed. The wind direction is illustrated by an arrow in example 450. Vehicle 420 can receive wind data associated with the wind 410, as discussed herein. Vehicle 420 can determine, based at least in part on the wind data and the size, an orientation of vehicle 420 where one side of vehicle 420 is downwind of wind 410 and can control a door on the side of vehicle 420 downwind of wind 410 so that when vehicle 420 is oriented in the orientation, a passenger entering or departing from vehicle 420 can be fully or partially protected from wind 410.

In some examples, vehicle 420 can perform the parallel parking maneuver when the length of the parking location can accommodate the length of vehicle 420, or when the length of the parking location can accommodate the length of vehicle 420 but the width of the parking location cannot accommodate the length of vehicle 420. In some examples, vehicle 420 can perform the bidirectional maneuver when the length of the parking location cannot accommodate the length of vehicle 420, but the width of the parking location can accommodate the length of vehicle 420. In some examples, the vehicle can perform the parallel parking maneuver when the wind direction is substantially perpendicular to the length of vehicle 420 when vehicle 420 positioned in a direction perpendicular to the length of the parking location.

Additionally, vehicle 420 can determine, based on the sensor data, that vehicle 420 is empty and vehicle 420 is in the parking location 402 or in the parking location 453. The sensor may include data representing a presence of odor and/or smoke. Vehicle 420 may orient itself in a direction perpendicular to wind 410. Vehicle 420 can open doors on both sides of vehicle 420 in order to allow wind 410 to act as a crosswind and remove the odor and/or smoke present in the vehicle.

Figure 5:
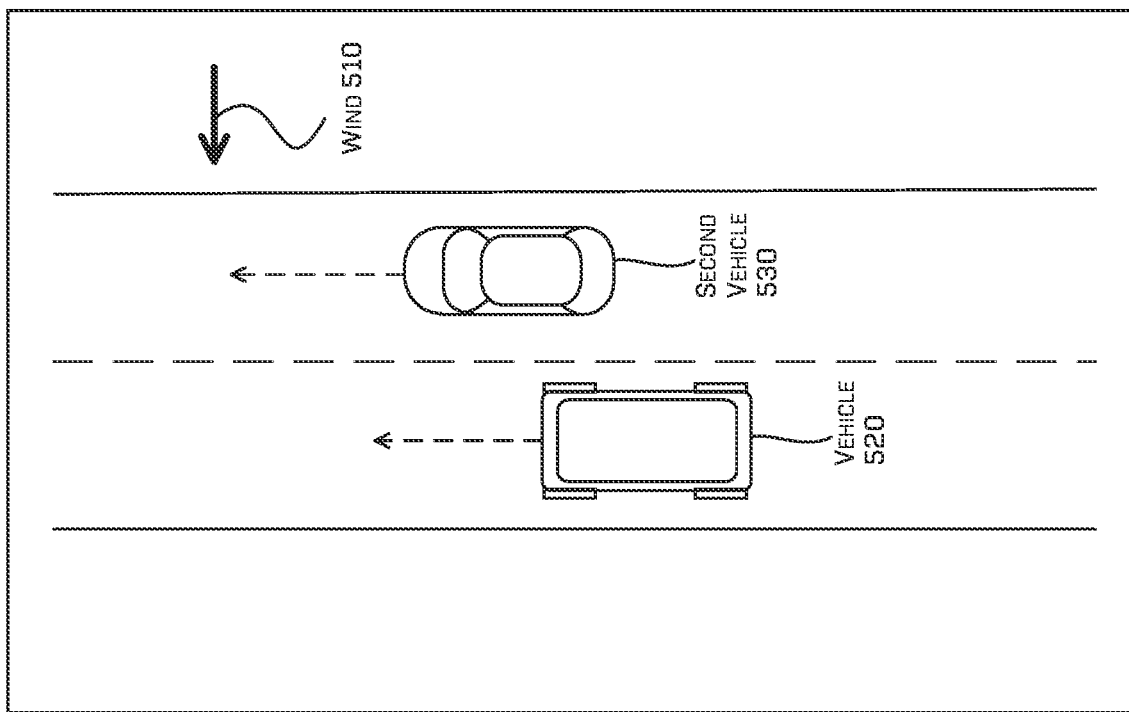
FIG. 5 is an illustration of determining a trajectory for a first vehicle relative to a second vehicle based on wind data.

FIG. 5 is an illustration of example 500 of a vehicle traversing a route alongside another vehicle.

Example 500 illustrates a top-down view of a vehicle 520 in an environment, which may include an autonomous vehicle and a second vehicle 530. Example 500 further includes a wind 510. Wind 510 includes a wind direction and/or a wind speed. The wind direction is illustrated by an arrow in example 500. The vehicle 520 can receive wind data associated with the wind 510, as discussed herein. Vehicle 520 can, based at least in part on the wind data and the sensor data, determine a position of the second vehicle 530 in a direction upwind of the vehicle 520. Vehicle 520 can, based on the sensor data, determine a speed of the second vehicle 530. Vehicle 520 can, based on the position of the second vehicle 530, position itself adjacent to and downwind of second vehicle 530. Vehicle 520, can, based on the speed of the second vehicle 530, synchronize its speed with the speed of the second vehicle 530.

In some examples, the vehicle 520 may be a first autonomous vehicle and the second vehicle 530 may be a second autonomous vehicle in a fleet with vehicle 520. Vehicle 520 and second vehicle 530 may be traversing from a same initial location to a same destination along a same route. Vehicle 520 and second vehicle 530 may be traversing part way along the same route. Vehicle 520 and second vehicle 530 may be arranged in a formation where the second vehicle 530 may correspond to a lead vehicle while vehicle 520 may correspond to a following vehicle.

Figure 6:
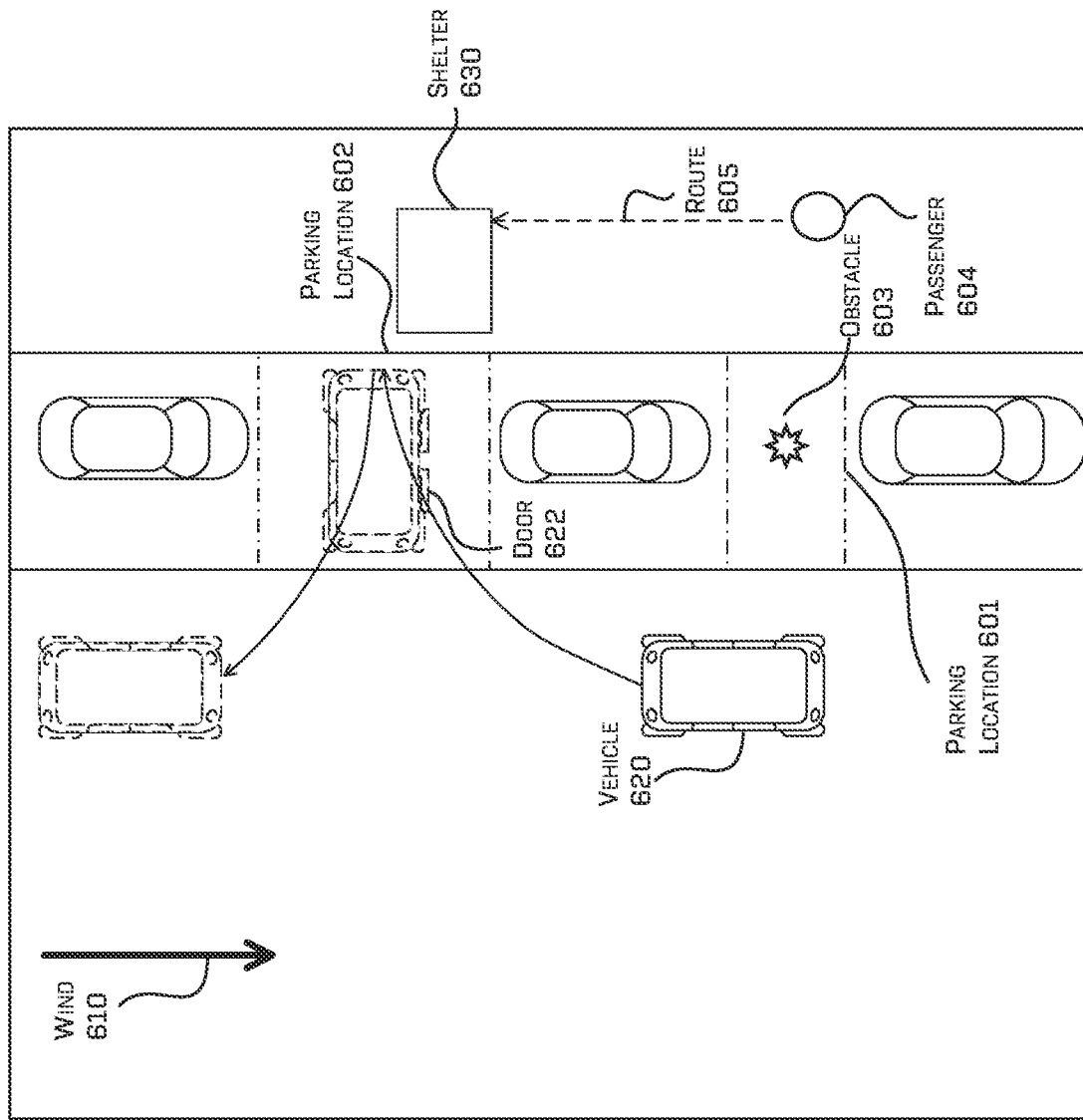
FIG. 6 illustrates determining a pick-up or drop-off location based on environmental factors.

FIG. 6 are illustrations of example 600 of selecting or otherwise determining a pick-up location and example 650 of selecting or otherwise determining a drop-off location.

Example 600 illustrates a top-down view of a vehicle 620 in an environment, which may be an autonomous vehicle. Example 600 further includes weather data indicative of, but not limited to, wind, rain, and/or snow. The weather data can include wind data from wind 610. Wind 610 includes a wind direction and a wind speed. The wind direction is illustrated by an arrow in example 600. The vehicle 620 can receive wind data associated with the wind 610 as discussed herein. The weather data can be captured by one or more sensor. The one or more sensor can additionally acquire image data representing an obstacle in the environment.

The obstacle may be a static object or a dynamic object. In some examples, the static object may be, but not limited to, a patch of ice, a puddle, a stationary vehicle, or a stationary pedestrian. In some examples, the dynamic object may be, but not limited to, a moving pedestrian, a moving bicyclist, or a moving vehicle. The vehicle may, based on the weather data, prioritize detection of the obstacle corresponding with the weather data. In some examples, if the weather data received by the vehicle is snow, then the vehicle may prioritize detection of the patch of ice. In some examples, if the weather data received by the vehicle is rain, then the vehicle may prioritize detection of the puddle.

Example 600 further includes a first candidate parking location 601 and a second candidate parking location 602. The vehicle 620 can determine, based at least in part on the sensor data, an obstacle 603 in the first candidate parking location 601. The vehicle can determine, based at least in part on the obstacle 603, the second candidate parking location 602 as a parking location, which may correspond to a pick-up location. The vehicle 620 can send an indication of the parking location to a user device associated with a passenger 604. The indication may correspond to a pin or other marker on a map of the user device or a route on the map. The route 605 may correspond to the indication as shown on the user device. The vehicle 620 can perform a parking maneuver such as those illustrated in FIG. 4 to enter and/or exit the parking location.

In some examples, while vehicle 620 is in second candidate parking location 601, vehicle 620 can determine, based on the image data, a trajectory of a dynamic object approaching vehicle 620. Vehicle 620 can determine, based on the trajectory of the dynamic object, an orientation of vehicle 620, wherein the orientation ensures at least one side of vehicle 620 is clear of the trajectory of the dynamic object. Vehicle 620 can determine, based on the orientation of vehicle 620, a door of vehicle 620 to open (such as door 622), wherein a trajectory of a passenger during one of ingress or egress using the door is clear of the trajectory of the dynamic object.

Examples of providing instructions to a user to navigate to a parking location can be found in, for example, U.S. Pat. No. 10,809,081, titled "User Interface and Augmented Reality For Identifying Vehicles and Persons" and issued Oct. 20, 2020, the entirety of which is herein incorporated by reference in its entirety for all purposes.

In some examples, vehicle 620 can determine, based on the image and/or the map data, the parking location as a location associated with a minimum impact on a passenger during one of ingress or egress from vehicle 620. In some examples, the minimum impact may be provided by shelter 630, which provides passenger 604 shelter and from wind 610 or other weather condition such as rain and/or snow during ingress into vehicle 620 or provide shelter to a passenger inside vehicle 620 during egress from vehicle 620. Vehicle 620 can, based on the location of shelter 630, perform the parking maneuver as discussed herein to allow passenger 604 to ingress vehicle 620 from shelter 630 using a door of vehicle 620 closest to shelter 630 or allow the passenger inside vehicle 620 to egress vehicle 620 to shelter 630 (e.g., door 622). Additionally and/or alternatively, vehicle 620 is oriented so that one or more passenger ingress into vehicle 620 through door 622 or egress out of vehicle 620 through door 622, the one or more passengers can be fully or partially protected from the weather condition.

Example 600 also illustrates that vehicle 620 can determine, based on the image and/or the map data, a size of the first candidate parking location 601 and a size of the second candidate parking location 602. The size of the second candidate parking location 602 is larger than the size of the first candidate parking location 601, and thereby allows vehicle 620 to orient itself along a wider range of angles than candidate parking location 601 and better shelter a passenger from wind 610 or other weather related events such as rain and/or snow. Therefore, vehicle may determine, based on the size of candidate parking location 601 and candidate parking location 602, candidate parking location 602 as the pick-up location or the drop-off location.

Figure 7:
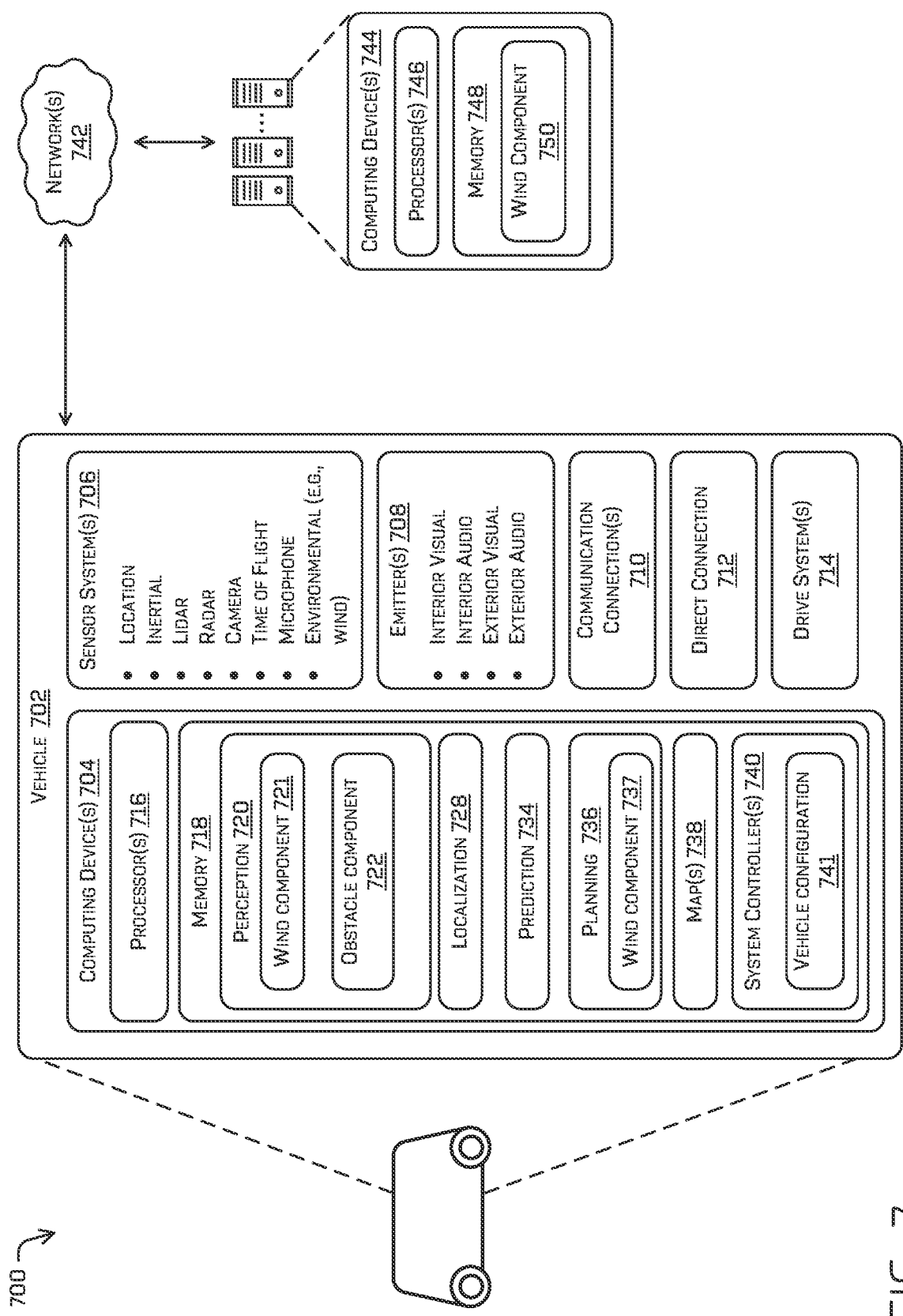
FIG. 7 depicts a block diagram of an example system for implementing the techniques described herein.

FIG. 7 depicts a block diagram of an example system 700 for implementing the techniques described herein. In at least one example, the system 700 can include a vehicle 702. In the illustrated example, system 700, the vehicle 702 is an autonomous vehicle; however, the vehicle 702 can be any other type of vehicle.

The vehicle 702 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 702 can be configured to control all functions from start to completion of the trip, including all parking functions, it may not include a driver and/or controls for driving the vehicle 702, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 702 can include one or more computing device(s) 704, one or more sensor system(s) 706, one or more emitter(s) 708, one or more communication connection(s) 710 (also referred to as communication devices and/or modems), at least one direct connection 712 (e.g., for physically coupling with the vehicle 702 to exchange data and/or to provide power), and one or more drive system(s) 714. The one or more sensor system(s) 706 can be configured to capture sensor data associated with an environment.

The one or more sensor system(s) 706 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 706 can include multiple instances of each of these or other types of sensors. For instance, the time-of-flight sensors can include individual time-of-flight sensors located at the corners, front, back, sides, and/or top of the vehicle 702. As another example, the camera sensors can include multiple cameras disposed at various locations about the exterior and/or interior of the vehicle 702. The one or more sensor system(s) 706 can provide input to the computing device 704.

The vehicle 702 can also include one or more emitter(s) 708 for emitting light and/or sound. The one or more emitter(s) 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 702 can also include one or more communication connection(s) 710 that enable communication between the vehicle 702 and one or more other local or remote computing device(s) (e.g., a remote teleoperation computing device) or remote services. For instance, the one or more communication connection(s) 710 can facilitate communication with other local computing device(s) on the vehicle 702 and/or the one or more drive system(s) 714. Also, the one or more communication connection(s) 710 can allow the vehicle 702 to communicate with other nearby computing device(s) (e.g., other nearby vehicles, traffic signals, etc.).

The one or more communications connection(s) 710 can include physical and/or logical interfaces for connecting the computing device 704 to another computing device or one or more external networks 742 (e.g., the Internet). For example, the one or more communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 702 can include one or more drive system(s) 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor system(s) 706 to detect conditions of the drive system(s) 714 and/or the surroundings of the vehicle 702. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) 706 on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) 706 and to control operation of the various vehicle systems. In some examples, the drive system controller can include one or more processor(s) and memory communicatively coupled with the one or more processor(s). The memory can store one or more components to perform various functionalities of the drive system(s) 714. Furthermore, the drive system(s) 714 also include one or more communication connection(s) that enable communication by the respective drive system with one or more other local or remote computing device(s).

The computing device 704 can include one or more processor(s) 716 and memory 718 communicatively coupled with the one or more processor(s) 716. In the illustrated example, the memory 718 of the computing device 704 stores a perception component 720 comprising a wind component 721, an object detector 722, a localization component 728, a prediction component 734, a planning component 736 comprising a wind component 737, a maps component 738, and one or more system controller(s) 740 comprising a vehicle configuration 741. Though depicted as residing in the memory 718 for illustrative purposes, it is contemplated that the perception component 720, the wind component 721, the object detector 722, the localization component 728, the prediction component 734, the planning component 736, the wind component 737, the maps component 738, the one or more system controller(s) 740, and the vehicle configuration 741 can additionally, or alternatively, be accessible to the computing device 704 (e.g., stored in a different component of vehicle 702) and/or be accessible to the vehicle 702 (e.g., stored remotely).

The perception component 720 can include functionality to perform object detection, segmentation, and/or classification. In some examples, the perception component 720 and/or the object detector 722 can provide processed sensor data that indicates a presence of an entity that is proximate to the vehicle 702 and/or a classification of the entity as an entity type (e.g., car, pedestrian, cyclist, building, tree, road surface, curb, sidewalk, unknown, etc.). In additional and/or alternative examples, the perception component 720 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

Further, the perception component 720 can include functionality to store perception data generated by the perception component 720. In some instances, the perception component 720 can determine a track corresponding to an object that has been classified as an object type. For purposes of illustration only, the perception component 720, using sensor system(s) 706 can capture one or more images of an environment. The sensor system(s) 706 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 506, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

In some examples, the wind component 721 can provide processed sensor data that indicates one or more characteristics associated with a wind such as a wind speed and/or a wind direction.

In general, the object detector 722 can detect (among other things) semantic objects represented by sensor data. In some examples, the object detector 722 can identify such semantic objects and can determine a two-dimensional or a three-dimensional bounding box associated with the object. The object detector 722 can determine additional information such as a location, orientation, pose, and/or size (e.g., length, width, height, etc.) associated with the object. The object detector 722 can send data to other components of the system 700 for localization and/or planning purposes, as discussed herein.

The localization component 728 can include functionality to receive data from the sensor system(s) 706 and/or other components to determine a position of the vehicle 702. For example, the localization component 728 can include and/or request/receive a three-dimensional map of an environment and can continuously determine a location of the autonomous vehicle within the map. In some instances, the localization component 728 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 728 can provide data to various components of the vehicle 702 to determine an initial position of an autonomous vehicle for generating a trajectory, as discussed herein.

Further, the localization component 728 can receive map data representing semantic objects and can receive detections of such semantic objects in sensor data for determining a location of the vehicle 702, as discussed herein.

The prediction component 734 can generate one or more probability maps representing prediction probabilities of possible locations of one or more objects in an environment. For example, the prediction component 734 can generate one or more probability maps for vehicles, pedestrians, animals, and the like within a threshold distance from the vehicle 702. In some instances, the prediction component 734 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 736 can determine a path for the vehicle 702 to follow to traverse through an environment. For example, the planning component 736 can determine various routes and paths and various levels of detail. In some instances, the planning component 736 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 736 can generate an instruction for guiding the autonomous vehicle along at least a portion of the route from the first location to the second location. In at least one example, the planning component 736 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 736 can alternatively, or additionally, use data from the perception component 720 and/or the prediction component 734 to determine a path for the vehicle 702 to follow to traverse through an environment. For example, the planning component 736 can receive data from the perception component 720 and/or the prediction component 734 regarding objects associated with an environment. Using this data, the planning component 736 can determine a route to travel from a first location (e.g., a current location) to a second location (e.g., a target location) to avoid objects in an environment.

In at least some examples, such a planning component 736 may determine there is no such collision free path and, in turn, provide a path which brings vehicle 702 to a safe stop avoiding all collisions and/or otherwise mitigating damage.

The planning component 736 can include wind component 737. Wind component 737 can provide processed sensor data that indicates one or more characteristics associated with a wind such as a wind speed and a wind direction.

The memory 718 can further include one or more maps 738 that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. A map can further include an object identifier, an object classification, a three-dimensional location, covariance data (e.g., represented in image data or a multi-resolution voxel space), and the like. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 738 can include at least one map (e.g., images and/or a mesh). In some examples, the vehicle 702 can be controlled based at least in part on the map(s) 538. That is, the map(s) 738 can be used in connection with the perception component 720 (and sub-components), the localization component 728 (and sub-components), the prediction component 734, and/or the planning component 736 to determine a location of the vehicle 702, identify objects in an environment, generate prediction probabilit(ies) associated with objects and/or the vehicle 702, and/or generate routes and/or trajectories to navigate within an environment.

In at least one example, the computing device 704 can include one or more system controller(s) 740, which can be configured to control steering, propulsion, braking, safety, emitters, communication, and other systems of the vehicle 702. These system controller(s) 740 can communicate with and/or control corresponding systems of the drive system(s) 714 and/or other components of the vehicle 702, which may be configured to operate in accordance with a path provided from the planning component 736.

In at least one example, one or more system controller(s) 740 can include vehicle configuration 741. Vehicle configuration 741 can include, but is limited to, one or more of a setting of a suspension component of vehicle 702, a setting of a caster of one or more wheels of vehicle 702, a setting of a camber of one or more wheels of vehicle 702, a setting of a toe of one or more wheels of vehicle 702, an orientation of one or more wheels of vehicle 702, or a heading of vehicle 702.

The vehicle 702 can connect to computing device(s) 744 via network 742 and can include one or more processor(s)

756 and memory 748 communicatively coupled with the one or more processor(s) 756. In at least one instance, the one or more processor(s) 756 can be similar to the processor(s) 716 and the memory 748 can be similar to the memory 718. In the illustrated example, the memory 748 of the computing device(s) 744 stores a wind component 750. The wind component 750 can provide wind data that indicates one or more characteristics associated with a wind such as a wind speed and/or a wind direction which, in at least some examples, is aggregated or otherwise determined over time. Sources of wind data may be from, but not limited to, sensor system(s) 706, sensor data aggregated from another vehicle, sensor data aggregated from a fleet of vehicles, and/or meteorological data from external sources as discussed herein.

The processor(s) 716 of the computing device 704 and the processor(s) 746 of the computing device(s) 744 can be any suitable processor capable of executing instructions to process data and perform operations as described herein. By way of example and not limitation, the processor(s) 716 and 746 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 718 computing device 704 and the memory 748 of the computing device(s) 744 are examples of non-transitory computer-readable media. The memory 718 and 748 can store an operating system and one or more software applications, instructions, programs, and/or data to implement the methods described herein and the functions attributed to the various systems. In various implementations, the memory 718 and 748 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 718 and 748 can be implemented as a neural network.

As described herein, an exemplary neural network is an algorithm that passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 8:
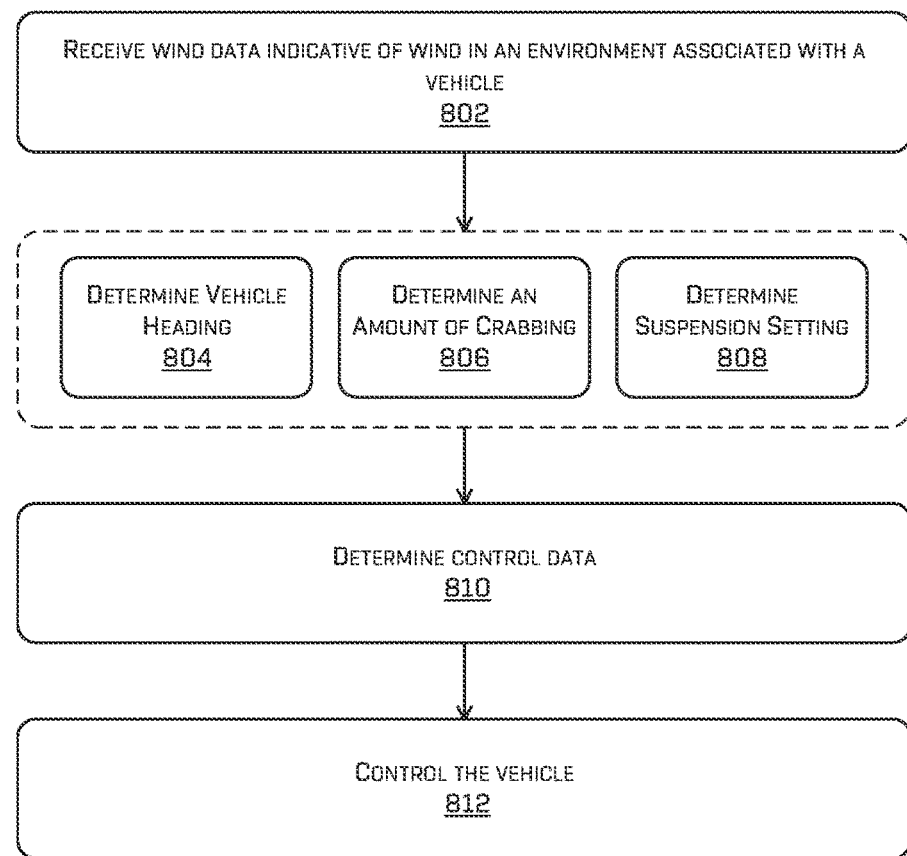
FIG. 8 is an example process for controlling a vehicle based on environmental factors in an environment.
Figure 9:
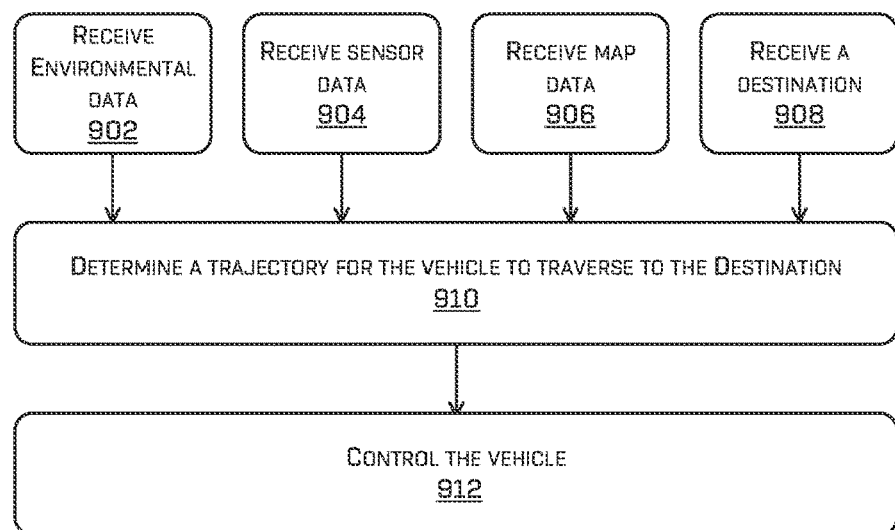
FIG. 9 is an example process for determining a parking location of a vehicle based on environmental factors.

FIGS. 1, 8, and 9 illustrate example processes in accordance with examples of the disclosure. These processes are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 8 is an example process 800 for controlling a vehicle in an environment. For example, some or all of the process 800 can be performed by one or more components in FIG. 7, as described herein. For example, some or all of the process 800 can be performed by the perception component 720, the planning component 736, and/or the system controllers 740.

At operation 802, the process can include receiving wind data indicative of wind in an environment associated with the vehicle. In some examples, the operation 802 can include receiving wind data from one or more wind sensors of an autonomous vehicle as the autonomous vehicle traverses through the environment or receiving or capturing image data from one or more image sensors of an autonomous vehicle as the autonomous vehicle traverses the environment. In some examples, the operation 802 can include receiving or capturing ultrasonic wind data from one or more ultrasonic wind sensors of an autonomous vehicle as the autonomous vehicle traverses the environment. Of course, other sensor types are contemplated herein.

At operation 804, the process can include determining, based at least in part on the wind data, a heading of the autonomous vehicle. In some examples, the operation 804 can include determining, based at least on the wind data and a reference trajectory received by the autonomous vehicle, an orientation of the body of the autonomous vehicle biased in a direction toward a source of wind while keeping all of the wheels of the autonomous vehicle parallel to the reference trajectory. Additional details associated with operation 804 are discussed in connection with FIG. 2, as well as throughout this disclosure.

At operation 806, the process can include determining an amount of crabbing of the autonomous vehicle. In some examples, the operation 806 can include determining, based at least in part on the reference trajectory and the wind data, an orientation of at least one wheel of the autonomous vehicle. Additional details associated with operation 806 are discussed in connection with FIG. 2, as well as throughout this disclosure.

At operation 808, the process can include determining a setting of a suspension component of the autonomous vehicle. In some examples, operation 808 can include determining, based at least in part on the wind data, a stiffness setting of at least one suspension component on a downwind side of the autonomous vehicle. Additional details associated with operation 806 are discussed in connection with FIG. 2, as well as throughout this disclosure.

At operation 810, the process can include determining control data based at least in part on the at least one of the heading, the amount of crabbing, or the setting of the suspension component. In some examples, operation 810 can include determining the control data based at least in part on the setting associated with the suspension component. In some examples, operation 810 can include determining the control data based at least in part on the heading. In some examples, operation 810 can include determining, based at least in part on the amount of crabbing, the control data.

At operation 812, the process can include controlling the vehicle based at least in part on the control data. In some examples, operation 812 includes controlling an autonomous vehicle based in part on the control data.

FIG. 9 is an example process 900 for a vehicle traversing in an environment to a destination of based at least on a environmental data and one or more of a sensor data or a map data. For example, some or all of the process 900 can be performed by one or more components in FIG. 7, as described herein. For example, some or all of the process 900 can be performed by the perception component 720, the planning component 736, and/or the system controllers 740.

At operation 902, the process can include receiving environmental data. In some examples, the environmental data may be captured by one or more sensors and may be indicative of a weather condition, as discussed herein, or may be received from other sources such as other vehicle, a remote computing device, and the like.

At operation 904, the process can include receiving a sensor data captured by the one or more sensors. In some examples, the sensor data may be sensor data other than environmental data. In some examples, the one or more sensor can include image sensors, lidar sensors, radar sensors, time of flight sensors, wind sensors, and the like.

At operation 906, the process can include receiving map data.

At operation 908, the process can include receiving a destination for a vehicle. In some examples, the destination may correspond to a pick-up location. In some examples, the destination may correspond to a drop-off location. In some examples the vehicle may be an autonomous vehicle.

At operation 910, the process can include determining, based at least in part on the environmental data and the parking location, a trajectory for the vehicle to traverse to the destination. Additional details associated with the operation 912 are discussed in connection with FIG. 3, as well as throughout this disclosure.

At operation 912, the process can include controlling the vehicle based at least in part on the trajectory. In some examples, operation 912 can include, but is not limited to, controlling the vehicle to follow a trajectory. In some examples, operation 912 can include, but is not limited to, determining an orientation of the vehicle associated a parking location at the destination. In some examples, operation 914 can include, but is not limited to, determining, based at least in part on the environmental data and the orientation, a door of the vehicle to open and opening the door. In some examples, operation 912 can include, but is not limited to, determining, based at least in part on the sensor data, a size of the parking location. In some examples, operation 912 can include, but is not limited to, determining, based at least in part on the size, entering the parking location using a parallel parking maneuver or a bidirectional maneuver. In some examples, operation 912 can include, but is not limited to, selecting, based at least in part on environmental data, the parallel parking maneuver or the bidirectional maneuver. In some examples, operation 912 can include, but is not limited to, controlling the vehicle into the parking location based on the selection, and the like.

Example Clauses

A: A system comprising: one or more processors; and one or more non-transitory computer-readable media storing computer-executable instructions that, when executed, cause the one or more processors to perform operations comprising: receiving wind data indicative of a wind velocity in an environment associated with an autonomous vehicle; determining, based at least in part on the wind data, vehicle configuration data, wherein the vehicle configuration data comprises one or more of: a heading of the autonomous vehicle, an amount of crabbing of the autonomous vehicle, or a suspension setting of the autonomous vehicle; determining control data based at least in part on the vehicle configuration data; and controlling the autonomous vehicle based at least in part on the control data.

B: The system of paragraph A, the operations further comprising: receiving the wind data from a wind sensor associated with the autonomous vehicle; determining, based on the wind data, a direction of wind proximate the autonomous vehicle; and determining the vehicle configuration data based at least in part on the direction of the wind.

C: The system of paragraph A or B, wherein the vehicle configuration data comprises the amount of crabbing of the autonomous vehicle, the operations further comprising: receiving a reference trajectory for traversing the environment; and determining, based at least in part on the reference trajectory and the wind data, an orientation of at least one wheel of the autonomous vehicle, wherein the orientation is biased in a direction towards a source of wind.

D: The system of any of paragraphs A-C, the operations further comprising: receiving a destination for the autonomous vehicle; determining, based at least in part on an initial position of the autonomous vehicle and the destination, a first candidate route and a second candidate route; determining, based at least in part on the wind data, a first wind score associated with the first candidate route and a second wind score associated with the second candidate route; and determining, as the control data and based at least in part on the first wind score and the second wind score, the first candidate route or the second candidate route.

E: The system of any of paragraphs A-D, the operations further comprising: receiving the wind data from a sensor associated with the autonomous vehicle, wherein the sensor comprises one or more of: an ultrasonic wind sensor; an anemometer; a pitot tube; or an audio sensor.

F: A method comprising: receiving wind data indicative of wind in an environment associated with a vehicle; determining, based at least in part on the wind data, vehicle configuration data; determining control data based at least in part the vehicle configuration data; and controlling the vehicle based at least in part on the control data.

G: The method of paragraph F, further comprising: determining, based on the wind data, a direction of wind proximate to the vehicle; and determining the vehicle configuration data based at least in part on the direction of wind.

H: The method of paragraph F or G, wherein controlling the vehicle comprises configuring a first suspension component associated with an upwind side of the vehicle to a first setting and a second suspension component associated with a downwind side of the vehicle to a second setting, the first setting having a lower stiffness than the second setting.

I: The method of any of paragraphs F-H, wherein determining the vehicle configuration data further comprises: receiving a reference trajectory for traversing the environment; receiving the wind data from a wind sensor associated with the vehicle; and determining, based at least in part on the reference trajectory and the wind data, at least one of: an amount of crabbing of the vehicle, or a heading of the vehicle.

J: The method of paragraph I, wherein the configuration data comprises the amount of crabbing of the vehicle, the method further comprising: determining, based at least in part on the reference trajectory and the wind data, an orientation of at least one wheel of the vehicle.

K: The method of paragraph I or J, wherein the configuration data comprises the heading of the vehicle, the method further comprising: determining, based at least on the reference trajectory and the wind data, an orientation of the body of the vehicle, wherein the orientation of the body of the vehicle is biased in a direction toward a source of the wind and an orientation of wheels of the vehicle are substantially parallel with the reference trajectory.

L: The method of any of paragraphs F-K, further comprising: receiving a destination for the vehicle; determining, based at least in part on an initial position of the vehicle and the destination, a first candidate route and a second candidate route; determining, based at least in part on the wind data, a first wind score associated with the first candidate route and a second wind score associated with the second candidate route; and determining the control data based at least in part on the first wind score and the second wind score.

M: The method of paragraph L, wherein the first wind score is indicative of a first energy efficiency and the second wind score is indicative of a second energy efficiency; the method further comprising: determining that the first energy efficiency is more efficient than the second energy efficiency.

N: The method of any of paragraphs F-M, further comprising: receiving the wind data from a sensor remote from the vehicle or from a database.

O: The method of any of paragraphs F-N, further comprising: receiving the wind data from a sensor associated with the vehicle, wherein the sensor comprises one or more of: an ultrasonic wind sensor; an anemometer; a pitot tube; or an audio sensor.

P: One or more non-transitory computer-readable media storing instructions executable by a processor, wherein the instructions, when executed, cause the processor to perform operations comprising: receiving wind data indicative of wind in an environment associated with a vehicle; determining, based at least in part on the wind data, vehicle configuration data; determining control data based at least in part on the vehicle configuration data; and controlling the vehicle based at least in part on the control data.

Q: The one or more non-transitory computer-readable media of paragraph P, wherein controlling the vehicle comprises configuring a first suspension component associated with an upwind side of the vehicle to a first setting and a second suspension component associated with a downwind side of the vehicle to a second setting, the first setting having a lower stiffness than the second setting.

R: The one or more non-transitory computer-readable media of paragraph P or Q, wherein determining the vehicle configuration data further comprises: receiving a reference trajectory for traversing the environment; receiving the wind data from a wind sensor associated with the vehicle; and determining, based at least in part on the reference trajectory and the wind data, at least one of: an amount of crabbing of the vehicle, or a heading of the vehicle.

S: The one or more non-transitory computer-readable media of paragraph R, wherein determining the amount of crabbing of the vehicle or the heading of the vehicle comprises determining the heading of the vehicle, the operations further comprising: determining, based at least on the reference trajectory and the wind data, an orientation of the body of the vehicle, wherein the orientation of the body of the vehicle is biased in a direction toward a source of the wind and an orientation of wheels of the vehicle are substantially parallel with the reference trajectory.

T: The one or more non-transitory computer-readable media of any of paragraphs P-S, the operations further comprising: receiving a destination for the vehicle; determining, based at least in part on an initial position of the vehicle and the destination, a first candidate route and a second candidate route; determining, based at least in part on the wind data, a first wind score associated with the first candidate route and a second wind score associated with the second candidate route; and determining the control data based at least in part on the first wind score and the second wind score.

U: A system comprising: one or more processors; and one or more non-transitory computer-readable media storing computer-executable instructions that, when executed, cause the one or more processors to perform operations comprising: receiving environmental data indicative of a weather condition of an environment through which an autonomous vehicle is traversing; receiving a destination associated with a pick-up location or a drop-off location; receiving one or more of map data or sensor data; determining, based at least in part on the destination and one or more of the map data or the sensor data, an orientation of the autonomous vehicle associated with the destination; determining, based at least in part on the environmental data and the orientation of the autonomous vehicle, a trajectory for the autonomous vehicle to traverse to the destination; and controlling the autonomous vehicle based at least in part on the trajectory.

V: The system of paragraph U, the operations further comprising: determining, based at least in part on environmental data and at least one of the trajectory or the orientation of the autonomous vehicle associated with the destination, a door of the autonomous vehicle to open, wherein controlling the autonomous vehicle comprises controlling the door of the autonomous vehicle to open.

W: The system of paragraph U or V, wherein receiving the map data or the sensor data comprises receiving the sensor data, the operations further comprising: determining, as a parking maneuver and based at least in part on the environmental data, a parallel parking maneuver or a bidirectional maneuver, wherein controlling the autonomous vehicle comprises controlling the autonomous vehicle based at least in part on the parking maneuver.

X: The system of any of paragraphs U-W, wherein receiving the map data or the sensor data comprises receiving the sensor data, the operations further comprising: determining, based at least in part on the sensor data, an obstacle in the environment; and determining, based at least in part on the obstacle, a parking location in the environment, wherein determining the trajectory is further based at least in part on the parking location.

Y: The system of any of paragraphs U-X, wherein receiving the map data or the sensor data comprises receiving the map data, the operations further comprising: determining, based at least in part on the map data and the environmental data, a parking location as a location associated with a minimum impact on a passenger from the environment during one or more of ingress or egress from the autonomous vehicle; and sending an indication of the parking location to a user device associated with a passenger.

Z: A method comprising: receiving environmental data associated with an environment through which a vehicle is traversing; receiving a destination for the vehicle; receiving one or more of map data or sensor data; determining, based at least in part on the environmental data, a trajectory for the vehicle to traverse to the destination; and controlling the vehicle based at least in part on the trajectory.

AA: The method of paragraph Z, wherein receiving the map data or the sensor data comprises receiving the sensor data, the method further comprising: determining, based at least in part on the destination and the sensor data, a parking location and a size of the parking location; and determining, based at least in part on the size of the parking location and the environmental data, a parking maneuver of the vehicle, wherein one side of the vehicle is positioned to shield a passenger from a weather condition during one of ingress or egress from the vehicle.

AB: The method of paragraph AA, wherein the parking maneuver comprises at least one of a parallel parking maneuver such that a front of the vehicle remains the same throughout; or a bidirectional maneuver such that the vehicle enters the parking location with the front associated with a first side of the vehicle and exits the parking location with the front associated with a second side of the vehicle opposite the first side.

AC: The method of any of paragraphs Z-AB, wherein receiving the map data or the sensor data comprises receiving the map data, the method further comprising: determining, based at least in part on the map data and the environmental data, a parking location associated with a minimum impact on a passenger from the environment during one of ingress or egress from the vehicle; and sending an indication of the parking location to a user device associated with a passenger.

AD: The method of any of paragraphs Z-AC, further comprising: determining, based at least in part on the trajectory, an orientation of the vehicle associated with the destination; and determining, based at least in part on the environmental data and the orientation, a door of the vehicle to open, wherein controlling the vehicle comprises controlling the door of the vehicle to open.

AE: The method of paragraph AD, further comprising: determining, based at least on the environmental data, the orientation of the vehicle wherein the door of the vehicle to open is oriented in a direction where the vehicle shields a passenger during one of ingress or egress from the vehicle from a weather condition.

AF: The method of any of paragraphs Z-AE, wherein the environmental data comprises wind data, the method further comprising: determining, based at least on the sensor data, an empty state of the vehicle and at least one of odor or smoke within the vehicle; determining, based at least on the empty state of the vehicle and at least one of odor or smoke within the vehicle, an orientation of the vehicle where a first door located at a first side of the vehicle and a second door located at a second side of the vehicle opposite the first side are substantially perpendicular to a source of the wind; and controlling, based at least in part on the orientation, the first door and the second door to open, wherein the wind enters the vehicle the first door and exits the vehicle through the second door and removes at least one of odor or smoke.

AG: The method of any of paragraphs Z-AF, further comprising: determining, based at least in part on the destination, a first parking location; determining, based at least in part on one or more of the map data or the sensor data, an obstacle in the environment located at the first parking location; and determining, based at least in part on the obstacle, a second parking location in the environment, wherein the second parking location is free of the obstacle.

AH: The method of paragraph AG, the method further comprising: wherein the environmental data comprises rain data or snow data; and wherein the obstacle comprises a puddle or ice.

AI: The method of any of paragraphs Z-AH, further comprising: determining, while the vehicle is at the destination and based at least on the sensor data, a trajectory of a dynamic obstacle approaching the vehicle; determining, based on the trajectory of the dynamic obstacle, an orientation of the vehicle; and determining, based on the orientation of the vehicle, a door to open, wherein a trajectory of a passenger during one of ingress or egress from the door is clear of the trajectory of the dynamic obstacle.

AJ: One or more non-transitory computer-readable media storing instructions executable by a processor, wherein the instructions, when executed, cause the processor to perform operations comprising: receiving environmental data associated with an environment through which a vehicle is traversing; receiving a destination for the vehicle; determining, based at least in part on the environmental data, a trajectory for the vehicle to traverse to the destination; and controlling the vehicle based at least in part on the trajectory.

AK: The one or more non-transitory computer-readable media of paragraph AJ, wherein receiving the map data or the sensor data comprises receiving the sensor data, the operations further comprising: receiving sensor data; determining, based at least in part on the destination and sensor data, a parking location and a size of the parking location; and determining, based at least in part on the size of the parking location and the environmental data, a parking maneuver of the vehicle, wherein one side of the vehicle is positioned to shield a passenger from a weather condition during one of ingress or egress from the vehicle.

AL: The one or more non-transitory computer-readable media of paragraph AJ or AK, wherein: determining, based at least in part on the trajectory, an orientation of the vehicle associated with the destination; and determining, based at least in part on the environmental data and the orientation, a door of the vehicle to open, wherein controlling the vehicle comprises controlling the door of the vehicle to open.

AM: The one or more non-transitory computer-readable media of any of paragraphs AJ-AL, wherein receiving the map data or the sensor data comprises receiving the map data, the operations further comprising: receiving map data; determining, based at least in part on the map data and the environmental data, a parking location associated with a minimum impact on a passenger from the environment during one of ingress or egress from the vehicle; and sending an indication of the parking location to a user device associated with a passenger.

AN: The one or more non-transitory computer-readable media of any of paragraphs AJ-AM, the operations further comprising: determining, based at least in part on the destination, a first parking location; determining, based at least in part on one or more of map data or sensor data, an obstacle in the environment located at the first parking location; and determining, based at least in part on the obstacle, a second parking location in the environment, wherein the second parking location is free of the obstacle.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing computer-executable instructions that, when executed, cause the one or more processors to perform operations comprising:
   receiving wind data indicative of a wind velocity in an environment associated with an autonomous vehicle;
   determining, based at least in part on the wind data and a body motion of the autonomous vehicle, a roll angle of the autonomous vehicle;
   determining, based at least in part on the wind data and the roll angle, vehicle configuration data, wherein the vehicle configuration data comprises:
     an amount of crab steering angle of the autonomous vehicle;
     a first stiffness setting of a first suspension component associated with an upwind side of the autonomous vehicle; and
     a second stiffness setting of a second suspension component associated with a downwind side of the autonomous vehicle, the first stiffness setting having a lower stiffness than the second stiffness setting;
     a trajectory for a bidirectional maneuver or parallel parking maneuver associated with a parking location:
   determining control data based at least in part on the vehicle configuration data; and
   controlling the autonomous vehicle based at least in part on the control data.

2. The system of claim 1, the operations further comprising:
   receiving the wind data from a wind sensor associated with the autonomous vehicle;
   determining, based on the wind data, a direction of wind proximate the autonomous vehicle; and
   determining the vehicle configuration data based at least in part on the direction of the wind.

3. The system of claim 1, wherein determining the amount of crab steering comprises:
   receiving a reference trajectory for traversing the environment; and
   determining, based at least in part on the reference trajectory and the wind data, an orientation of at least one wheel of the autonomous vehicle, wherein the orientation is biased in a direction towards a source of wind.

4. The system of claim 1, the operations further comprising:
   receiving a destination for the autonomous vehicle;
   determining, based at least in part on an initial position of the autonomous vehicle and the destination, a first candidate route and a second candidate route;
   determining, based at least in part on the wind data, a first wind score associated with the first candidate route and a second wind score associated with the second candidate route; and
   determining, by the autonomous vehicle and as the control data and based at least in part on the first wind score and the second wind score, the first candidate route or the second candidate route to follow from the initial position to the destination.

5. The system of claim 1, the operations further comprising:
   receiving the wind data from a sensor associated with the autonomous vehicle, wherein the sensor comprises one or more of:
   an ultrasonic wind sensor;
   an anemometer;

a pitot tube; or
an audio sensor.

6. A method comprising:
- receiving wind data indicative of wind in an environment associated with a vehicle;
- determining, based on the wind data and a body motion of the vehicle, a roll angle of the vehicle;
- determining, based at least in part on the wind data and the roll angle of the vehicle, vehicle configuration data, the vehicle configuration data comprising:
  - an amount of crab steering angle of the vehicle;
  - a first stiffness setting of a first suspension component associated with an upwind side of the vehicle; and
  - a second stiffness setting of second suspension component associated with a downwind side of the vehicle, the first stiffness setting having a lower stiffness than the second stiffness setting;
  - a trajectory for a bidirectional maneuver or parallel parking maneuver associated with a parking location:
- determining control data based at least in part on the vehicle configuration data; and
- controlling the vehicle based at least in part on the control data.

7. The method of claim 6, further comprising:
- determining, based on the wind data, a direction of the wind proximate to the vehicle and a force of the wind; and
- determining the vehicle configuration data based at least in part on the direction of the wind and the force of the wind.

8. The method of claim 6, wherein determining the vehicle configuration data further comprises:
- receiving a reference trajectory for traversing the environment;
- receiving the wind data from a wind sensor associated with the vehicle; and
- determining, based at least in part on the reference trajectory and the wind data, the amount of crab steering angle of the vehicle.

9. The method of claim 8, the method further comprising:
- determining, based at least in part on the reference trajectory and the wind data, an orientation of at least one wheel of the vehicle.

10. The method of claim 8, wherein the vehicle configuration data further comprises a heading of the vehicle, the method further comprising:
- determining, based at least on the reference trajectory and the wind data, an orientation of a body of the vehicle, wherein the orientation of the body of the vehicle is biased in a direction toward a source of the wind and an orientation of wheels of the vehicle are substantially parallel with the reference trajectory.

11. The method of claim 6, further comprising:
- receiving a destination for the vehicle;
- determining, based at least in part on an initial position of the vehicle and the destination, a first candidate route and a second candidate route;
- determining, based at least in part on the wind data, a first wind score associated with the first candidate route and a second wind score associated with the second candidate route; and
- determining, by the vehicle and as the control data based at least in part on the first wind score and the second wind score, the first candidate route or the second candidate route to follow from the initial position to the destination.

12. The method of claim 11, wherein the first wind score is indicative of a first energy efficiency and the second wind score is indicative of a second energy efficiency; the method further comprising:
- determining that the first energy efficiency is more efficient than the second energy efficiency.

13. The method of claim 6, further comprising:
- receiving the wind data from a sensor remote from the vehicle or from a database.

14. One or more non-transitory computer-readable media storing instructions executable by a processor, wherein the instructions, when executed, cause the processor to perform operations comprising:
- receiving wind data indicative of wind in an environment associated with a vehicle;
- determining, based on the wind data and a body motion of the vehicle, a roll angle of the vehicle;
- determining, based at least in part on the wind data and the roll angle of the vehicle, vehicle configuration data, the vehicle configuration data comprising:
  - an amount of crab steering angle of the vehicle;
  - a first stiffness setting of a first suspension component associated with an upwind side of the vehicle; and
  - a second stiffness setting of second suspension component associated with a downwind side of the vehicle, the first stiffness setting having a lower stiffness than the second stiffness setting;
  - a trajectory for a bidirectional maneuver or parallel parking maneuver associated with a location at a destination:
- determining control data based at least in part on the vehicle configuration data; and
- controlling the vehicle based at least in part on the control data.

15. The one or more non-transitory computer-readable media of claim 14, wherein controlling the vehicle comprises configuring the first suspension component to the first stiffness setting and the second suspension component to the second stiffness setting.

16. The one or more non-transitory computer-readable media of claim 14, wherein determining the vehicle configuration data further comprises:
- receiving a reference trajectory for traversing the environment;
- receiving the wind data from a wind sensor associated with the vehicle; and
- determining, based at least in part on the reference trajectory and the wind data, the amount of crab steering angle of the vehicle.

17. The one or more non-transitory computer-readable media of claim 16, wherein determining the amount of crab steering angle of the vehicle comprises determining a heading of the vehicle, the operations further comprising:
- determining, based at least on the reference trajectory and the wind data, an orientation of a body of the vehicle, wherein the orientation of the body of the vehicle is biased in a direction toward a source of the wind and an orientation of wheels of the vehicle are substantially parallel with the reference trajectory.

18. The one or more non-transitory computer-readable media of claim 14, the destination being a first destination, the operations further comprising:
- receiving a second destination for the vehicle;
- determining, based at least in part on an initial position of the vehicle and the second destination, a first candidate route and a second candidate route;

determining, based at least in part on the wind data, a first wind score associated with the first candidate route and a second wind score associated with the second candidate route; and determining, by the vehicle and as the control data based at least in part on the first wind score and the second wind score, the first candidate route or the second candidate route to follow from the initial position to the second destination.

19. The system of claim 1, the operations further comprising:

determining, based on map data, the parking location at a destination; and wherein determining the vehicle configuration data further comprises determining, based on the parking location and the wind data at the destination, the trajectory for the bidirectional parking maneuver or parallel parking maneuver.

20. The system of claim 1, wherein the vehicle configuration data is further determined based on a position of a passenger inside the autonomous vehicle.

* * * * *